United States Patent Office 2,893,597
Patented July 7, 1959

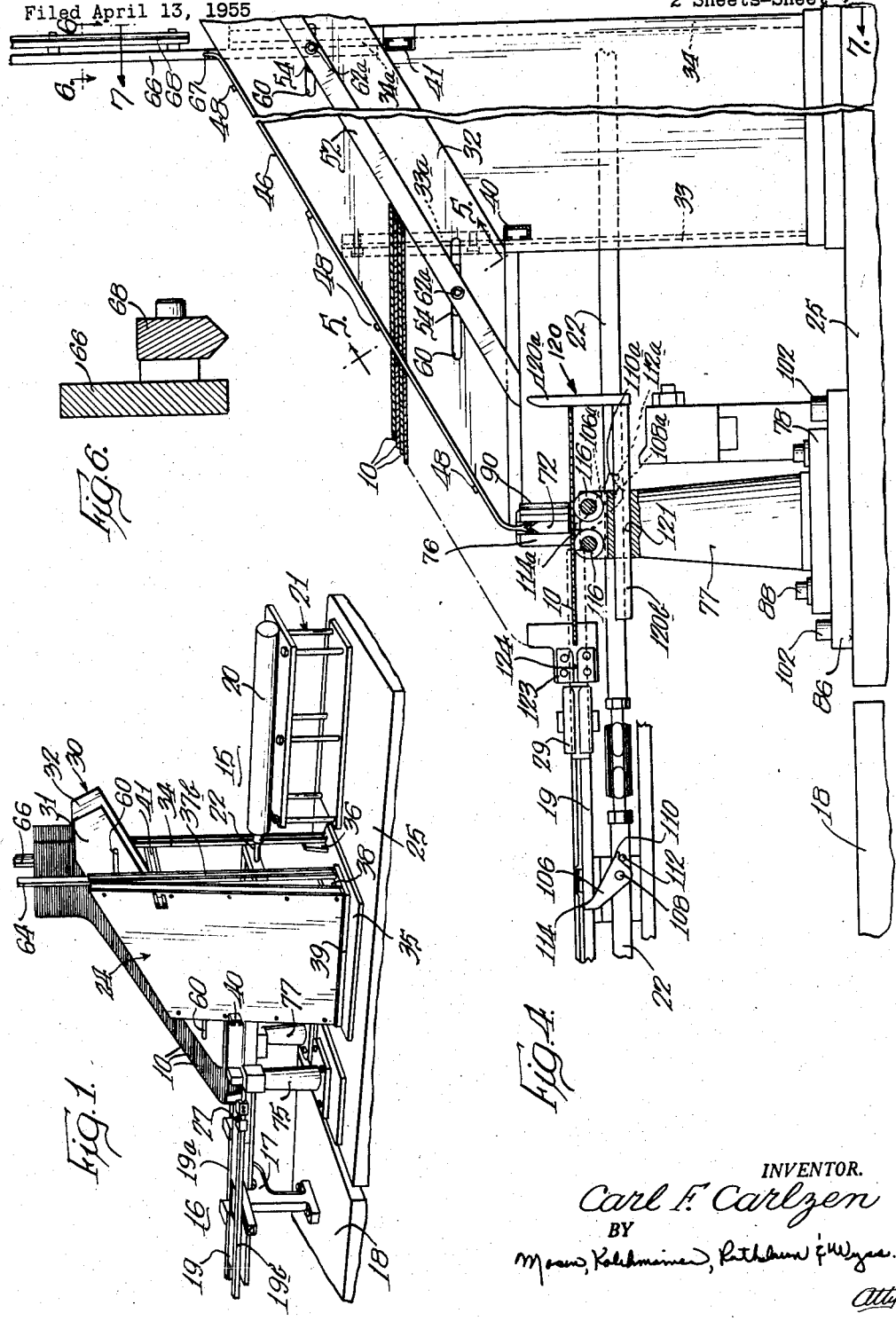

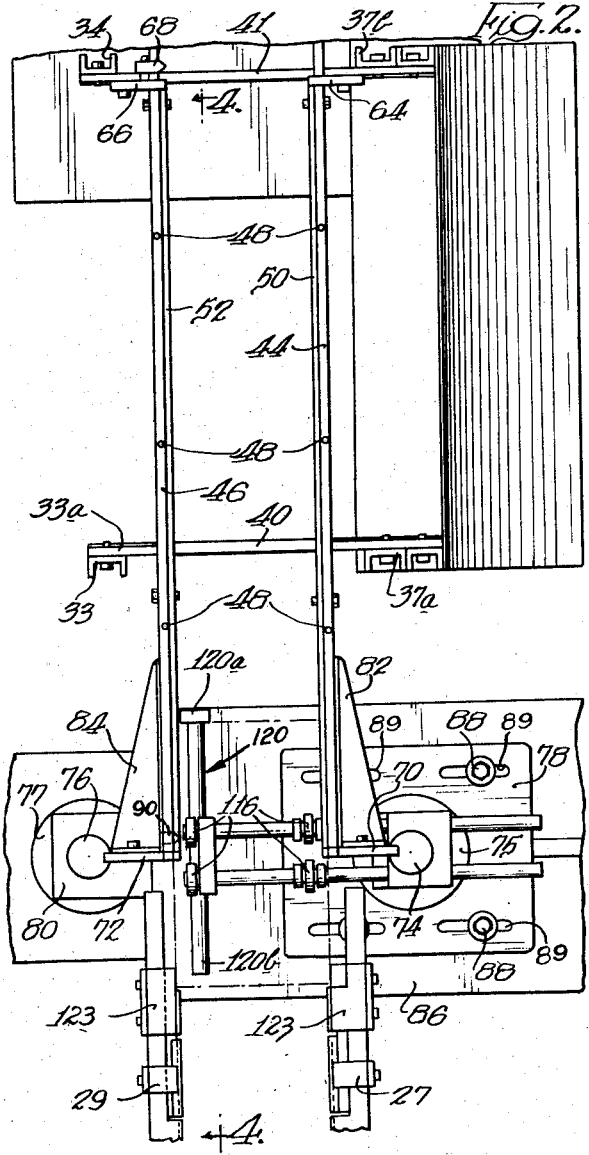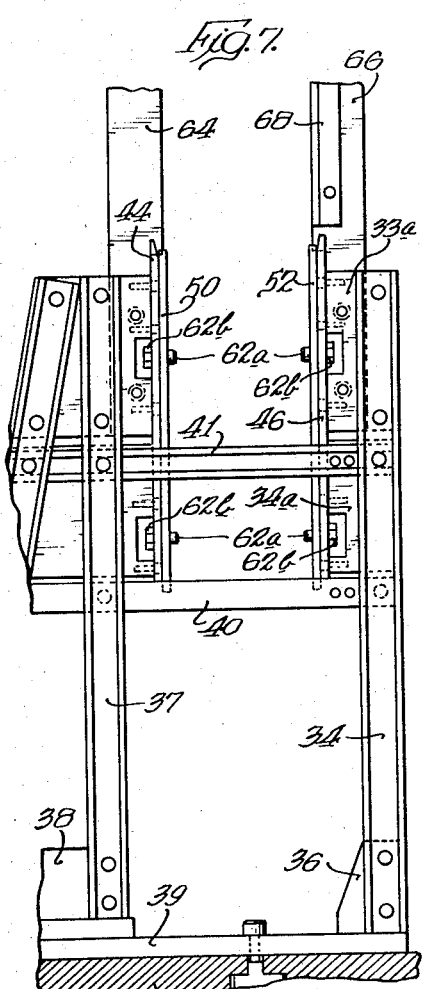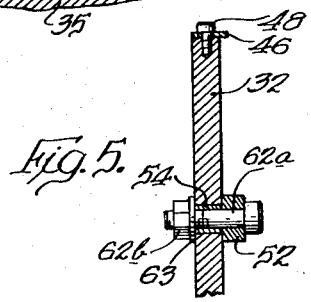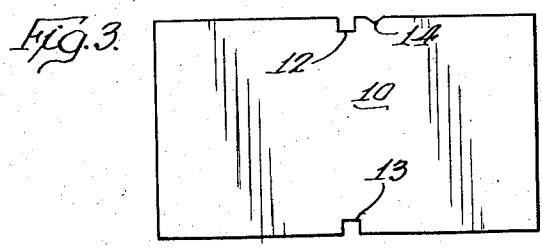

2,893,597

HOPPER CONSTRUCTION FOR AUTOMATIC ASSEMBLY APPARATUS

Carl F. Carlzen, Buffalo, N.Y., assignor to Sylvania Electric Products, Inc., a corporation of New York Application April 13, 1955, Serial No. 501,101

3 Claims. (Cl. 221—238)

This invention relates to hopper constructions for use with automatic assembly apparatus, more particularly to a hopper for feeding to an automatic conveyor articles upon which predetermined automatic operations are to be performed at various stations along the conveyor, and the invention has for an object the provision of a simple, reliable and fully automatic hopper for use with transfer apparatus of this character.

The mechanization of factories and particularly the mechanization of production lines which presently require the performance of numerous and precise manual operations has become of increasing importance because of the necessity for reducing costs, while maintaining or even improving quality, and numerous proposals have been advanced for providing automatic machinery for completely or at least partially mechanizing such production lines. For example, in the manufacture of various types of electronic apparatus improvements in printed circuit techniques have made possible the automatic fabrication of all or at least a part of the equipment by the placing of a large number of circuit components, i.e., resistors, condensers, tube sockets, transformers and the like, on a base or panel upon which the intercircuit connections have previously been printed.

Automatic assembly apparatus of the above indicated type is described and claimed in a co-pending application Serial No. 454,964, filed September 9, 1954, in the names of the present inventor and William L. Lehner and assigned to the same assignee as the present invention. In general, equipment for mechanizing production lines for the fabrication of electronic equipment, and in particular the automatic assembly apparatus of the heretofore mentioned application, makes it desirable to supply the individual components of the fabricated equipment to the assembly apparatus automatically and with a minimum number of manual operations. In automatic assembly machinery for mechanizing the production lines for the manufacture of printed circuits, the baseboards upon which the intercircuit connections are printed and on which the circuit components are placed have a relatively large surface area with respect to the thickness thereof such that it is not uncommon for these boards to be warped prior to the time they are placed in the automatic assembly apparatus, and therefore, the usual types of hopper constructions as known in the prior art frequently become clogged and require an undue amount of attention if they are to provide a relatively constant supply of baseboards to the transfer mechanism.

It is accordingly a further object of the invention to provide a hopper construction for use with automatic transfer apparatus wherein circuit baseboards, whether warped or not, may be supplied at a relatively fast rate to the transfer apparatus in a reliable manner.

Briefly, in accordance with the present invention a gravity feed hopper is provided for individually and successively supplying a plurality of printed circuit baseboards to a horizontal conveyor. The hopper, which is positioned above the conveyor, includes a guide chute in which the boards are stacked for feeding to the conveyor, the chute being inclined toward the horizontal so that its principal axis meets the conveyor at an acute angle along the direction of movement thereof, thus avoiding the difficulties that are encountered due to excessive weight on the bottom boards if a vertical chute of substantial height is employed. So as to prevent warped boards from clogging the chute, the chute is provided with a pair of opposed guide tracks which are adapted to engage the base boards at the opposite edges and substantially at the longitudinal median points thereof and guide rails are disposed parallel to and directly beneath the tracks. The baseboards are each supported by the coaction of the tracks and the rails in a horizontal position one upon the other as they slide, under the force of gravity, down the hopper chute toward and onto the conveyor. To facilitate the feeding of the baseboards individually and successively from the chute to the conveyor, the lower end of the chute is curved downwardly so that the boards are guided in a vertical stack directly above the conveyor, and the guide tracks terminate above the conveyor at a distance greater than the thickness of one but less than the thickness of two of the baseboards. Therefore, since only the bottom baseboard may be removed from the hopper by the engagement thereof with the horizontally moving conveyor, the baseboards are supplied one by one to the conveyor.

The invention, both as to its organization and method of operation, together with further objects and advantages thereof, will best be understood by reference to the following detailed description taken in connection with the accompanying drawings, in which:

Fig. 1 is a perspective view showing a preferred embodiment of the present invention for use in connection with an automatic transfer mechanism;

Fig. 2 is a plan view of the hopper construction of the present invention and a portion of the transfer mechanism associated therewith;

Fig. 3 is a plan view of a printed circuit baseboard of the type to be fed to a transfer mechanism from the hopper of the present invention;

Fig. 4 is an elevational sectional view taken substantially along the line 4—4 of Fig. 2;

Fig. 5 is a fragmentary sectional view taken along the line 5—5 of Fig. 4;

Fig. 6 is a sectional view taken along the line 6—6 of Fig. 4; and

Fig. 7 is an end view, taken substantially along the line 7—7 of Fig. 4.

Referring now to Fig. 3 of the drawings, the printed circuit baseboard 10 there shown constitutes a rectangular member, generally constructed of a self-supporting material having good insulating characteristics, such, for example, as fiberboard, and which is provided with a pair of rectangularly-shaped notches 12 and 13 located in the opposite side edges of the board 10 approximately midway between the opposite ends thereof and with an accurately located V-shaped notch 14 located adjacent the notch 12 so as to form a position determining portion of the board 10. In cooperation with the apparatus embodying the present invention, the notch 14 serves to insure proper positioning of the baseboard 10 on the transfer mechanism such that the circuit components are properly positioned by the automatic assembly apparatus on the baseboard 10, and the notches 12 and 13 serve to facilitate the supporting and transferring of the baseboard 10. Although the notches 12, 13 and 14 are shown as being formed in the baseboard 10, it will be understood that if desired the boards 10 may be accurately located on and secured to a supporting frame, and positioning means, whether in the form of a notch or other uniquely constructed portion, may be formed in or on the frame. Accordingly, the term "artitcles having accurately located positioning means thereon" as used in the claims is intended to include either an article such as the baseboard 10 having notches 12 and 13 and a positioning notch 14 or the combination of a similar board or article and frame, the frame being provided with the positioning means.

Referring now more particularly to Fig. 1, the invention is shown as embodied in a hopper 24 for use with a transfer mechanism comprising a base member 25, a prime mover section 15, and a transfer or conveyor mechanism 16 along which are provided a plurality of substantially identical component inserting or assembling stations (not shown). The transfer mechanism 16 is of the type described in the hereinbefore mentioned copending application and includes a plurality of upright supports 17 which are secured to the base plate 18 and carry a longitudinal guide track 19 along which the baseboards 10 are moved past the individual assembly stations.

It will be appreciated, and as fully disclosed in the hereinbefore mentioned application, that the guide track 19 consists of a pair of grooved track members 19a and 19b disposed in parallel relationship; the grooves of which are adapted to receive the opposite edges of the baseboards 10 so that these boards may be slidably moved along the track 19 by the reciprocation of a transfer bar 22. The transfer bar 22 is operatively attached to the piston of a reciprocating air motor 20 in the prime mover section 15 and in addition to slidably moving the baseboards 10 along the track 19 past the assembly stations, individually and successively removes the baseboards 10 from the hopper 24 in a manner to be more fully described hereinafter. The air motor 20 is supported on a suitable mounting stand 21 so that the transfer rod 22 may be directly connected to the piston of the motor 20. Although the hopper 24 of the present invention finds utility with a continuously moving conveyor, it is especially applicable to the transfer mechanism of the type disclosed in the hereinbefore mentioned application and, consequently, is described for use in connection therewith.

Very briefly then, the transfer mechanism 16 includes a pair of suitably grooved guide members 27 and 29 which are disposed at the forward end of the tracks 19a and 19b, respectively, and adapted to receive the baseboards 10 as they are slidably moved towards the guide track 19 from the hopper 24. In order to move the baseboards 10 in step-by-step fashion along the guide track 19, a plurality of fingers 106 (Fig. 4) are pivotally attached to the transfer bar 22 at spaced locations thereon by means of respective shafts 108 which extend inwardly from the bar 22. The fingers 106 are biased in clockwise movement as viewed in Fig. 4 so that a tail piece 110 formed on the rear end of the finger 106 is normally held in engagement with a stop pin 112 also carried by the transfer bar 22. This bias may conveniently be provided by means of coil springs supported on the shafts 108.

The forward end of each of the fingers 106 is shaped to form a driving and camming tip 114 which, with the parts in the position shown in Fig. 4, corresponding to the retracted position of the air motor 20, extends upwardly into the notch 12 of the particular baseboard 10 which is positioned in the track 19 at the location of the particular finger 106 in question. The fingers 106 are spaced apart by the distance between adjacent assembly stations and the rod 22 is extended this same distance upon each actuation of the air motor 20. Therefore, when the motor 20 is actuated to fully extend the transfer rod 22, each of the fingers 106 moved from a position opposite one assembly station to a position opposite the next succeeding assembly station.

The fingers 106 are so constructed that when the air motor 20 is energized to extend the transfer rod 22, the tips 114 of each of the fingers 106 engage the forward edges of the notches 12 of the respective baseboards 10, thus causing the boards 10 to be slidably moved along the track 19 to the next succeeding assembly station. Upon return movement of the piston of the air motor 20, the sloping rear surface of the tips 114 will engage the rear edges of the notches 12 of the boards which have just been transferred so as to rotate the fingers 106 against the force exerted thereon by the bias springs and thus cause the fingers 106 to move rearwardly beneath the baseboards 10 that have just been transferred and beneath the baseboards 10 in the previous assembly stations so that upon the next extension of the rod 22 the fingers 106 will transfer each of the baseboards 10 to the next succeeding assembly stations.

Positioning means, disposed at each assembly station for engagement in the positioning notches 14, are adjusted so as to be inserted into the V-shaped positioning notches and held therein while the rod 22 and, consequently, the fingers 106 are retracted.

In order to place the baseboards 10 in the track 19 in a proper position for movement by the fingers 106 from one station to another, one of the fingers 106 and associated parts are included as part of the hopper mechanism and used to remove the baseboards 10 from the hopper and to feed them individually and successively through the grooved guide members 27 and 29 onto the guide track 19. This finger and associated parts are designated by the same numerals which identify the other fingers and include the suffix a.

The hopper 24 additionally consists of an inclined chute 30, generally defined by a pair of channel defining side walls 31 and 32, the side wall 32 being supported by front and rear upright members 33 and 34. The uprights 33 and 34 are attached to the wall 32 by means of brackets 33a and 34a (Fig. 7), the brackets being bolted to the uprights and bolted to the wall 32, and the uprights 33 and 34 are fixedly secured to a base plate 35 by means of a plurality of brackets 36. The channel defining side wall 31 is similarly secured to front and rear upright members, 37a and 37b. In order to enable adjustment of the spacing between the members 31 and 32, the uprights supporting the member 31 are attached by means of brackets 38 to a flat support member 39 which is movably secured to the base plate 35. Therefore, in order to adjust the width of the chute 30, the base member 39 is slidably moved laterally along the base plate 35 toward or away from the uprights 33 and 34. In order to maintain the upright members 33, 34 and 37a and 37b in a vertical position, a plurality of cross members 40 and 41 are arranged beneath the chute 30 and attached as by means of bolts to the opposite upright members.

So as to facilitate the use of the transfer rod 22 for removing the baseboards 10 from the hopper 24 and for simultaneously moving each board 10 so removed from the hopper 24 to the first assembly station on the track 19, the chute 30 is supported forward of the first assembly station with the feeding end thereof located at the retracted position of the finger 106a. Therefore, the boards 10 which are stacked in the chute 30 may be successively fed to the track 19 by means of the pivoted finger 106a each time the transfer rod 22 is extended. Also, so as to facilitate the use of the positioning and locating notches 12, 13 and 14 to support the boards 10 in the chute 30 and additionally to properly orient them in the chute 30 so that they will be fed in the correct position to the feeding mechanism, the chute 30 is arranged with its principal axis in the same plane as the principal axis of the track 19.

The baseboards 10 are supported in stacked relationship in the chute 30 by means of a pair of opposed guide tracks 44 and 46 (the track 46 being shown best in Fig. 4) which are respectively attached to the upper edges of the channel defining members 31 and 32 by means of a plurality of headed screws 48. The guide tracks 44 and 46 extend from the side members 31 and 32 into the channel in the chute 30 and are adapted to slidably receive the notches 12 and 13 of the baseboards 10 so that when the baseboards 10 are placed in the hopper 24 they will move by gravity down the chute 30 along the guide tracks 44 and 46 to a position above the finger 106a for feeding to the transfer mechanism 16. In order to permit the stacking of a large number of baseboards 10 in the hopper 24 in a location where overhead space is limited and also to minimize the downward force exerted on the lowermost board by the other boards in the hopper 24 so that automatic removal of the boards from the hopper 24 is facilitated, it is desirable to incline the chute 30 at a substantial angle of inclination. While greater or lesser angles of inclination may be satisfactorily employed, in a reduction to practice of this invention, an angle of about thirty degrees was found to be desirable.

In order to maintain the baseboards 10 in a horizontal position for feeding to the horizontal conveyor portion of the transfer mechanism 16, a pair of guide rails 50 and 52 are respectively attached to the inner walls of the channel defining members 31 and 32 parallel to the respective guide tracks 44 and 46. By properly adjusting the distance between the guide tracks 44 and 46 and the respective guide rails 50 and 52, the rear edges of the baseboards 10 which are supported on the chute 30 ride on the rails 50 and 52, thereby to maintain the baseboards 10 in a horizontal position one upon the other.

To accommodate baseboards of different lengths in the chute 30, the guide rails 50 and 52 are slidably supported on their respective channel defining members 31 and 32 by means of a plurality of longitudinal rods 54 which are slidably supported for horizontal movement in horizontal slots 60 provided in the walls of the channel defining members 31 and 32. The rods 54 are attached to the respective guide rails 50 and 52 by means of threaded bolts 62a and coacting nuts 62b. A plurality of washers 63 (best shown in Fig. 5) having a diameter exceeding the width of the slots 60 are provided between the nuts 62b and the respective channel defining member 31 and 32. Therefore, when the bolts 62a are tightened down, the rails 50 and 52 are tightly pressed against the respective inner walls of the members 31 and 32 and thereby maintained in a fixed position with respect to the guide tracks 44 and 46; when, the bolts 62a are loosened, the respective tracks 50 and 52 may be moved towards or away from the respective guide tracks 44 and 46. However, because of the coaction of the longitudinal rods 54 and the horizontal slots 60, the guide rails 50 and 52 are always maintained substantially parallel with the guide tracks 44 and 46 so that the baseboards 10 are maintained in a fixed relative position with one another as they slidably move down the chute to the conveyor irrespective of the spacing between the tracks 44 and 46 and the rails 50 and 52. The slots 60 are horizontally disposed so that the force exerted on the rails 50 and 52 by the weight of the baseboards 10 in the chute 30 does not cause the rails 50 and 52 to move out of adjustment even after prolonged periods of use where the entire equipment is subjected to substantial vibration.

In order to facilitate the introducing of the baseboards 10 into the chute 30 and to insure that the boards placed therein are properly oriented, the upper ends of the guide tracks 44 and 46 are upturned so as to provide a gradually curved track which meets a pair of vertical guide tracks 64 and 66 disposed at the upper end of the chute 30. Although the guide tracks 64 and 66 could be integrally formed with the guide tracks 44 and 46, it is desirable that the thickness of the upright guide tracks 64 and 66 exceed that of the inclined guide tracks 44 and 46, and accordingly, the vertical and inclined tracks are constructed separately. The juxtaposed ends of these tracks may be of any convenient construction, but preferably grooves 67 are provided in the lower ends of the tracks 64 and 66 which are adapted to receive the upturned ends of the guide tracks 44 and 46. A V-shaped rail 68 having a surface adapted to mate with the notches 14 in the baseboards 10, is supported parallel to the vertical guide track 66 and spaced therefrom at a distance equal to the distance between the notch 12 and the notch 14 in the baseboards 10. Therefore, as the boards are placed into the chute 30 by dropping them vertically from above the rails 64, 66 and 68 with the notches 12, 13 and 14 in the baseboards 10 aligned therewith, the baseboards 10 are necessarily properly oriented for positioning on the conveyor of the transfer mechanism 16.

In order to maintain the baseboards 10 in a vertical stack above the feeding mechanism, the lower ends of the guide tracks 44 and 46 are turned downwardly directly above the location of the finger 106a. It is necessary that the thickness of the guide tracks 44 and 46 be substantially less than the thickness of the notches 12 and 13 so that the baseboards 10 may be maintained in a horizontal position in the chute 30, and to utilize the downturned portion of the tracks 44 and 46 to longitudinally position the boards 10 with the notches 12 in register with the tip 114a of the finger 106a, the thickness of the tracks 44 and 46, is increased, as shown best in Fig. 4, at the downturned portions thereof. Consequently, the lower end of the guide tracks 44 and 46 are tapered so that the lower portions thereof have a thickness approaching that of the notches 12 and 13 in the baseboards 10 whereby as the baseboards 10 pass from the inclined chute 30 to the upright portion of the hopper 24 they are automatically and fairly accurately positioned along the direction of movement of the transfer mechanism 16 by the guide tracks 44 and 46.

In order to facilitate the installation of the hopper 24 in an automatic assembly apparatus and to facilitate the adjustment thereof to accommodate different sizes of baseboards 10, it is desirable that the lower portion of the hopper 24 where the baseboards 10 are stacked vertically one upon the other be separate from the inclined chute portion. Therefore, a pair of vertically disposed guide rails 70 and 72 having a thickness approaching that of the notches 12 and 13 are supported by and extend inwardly from a pair of supporting members 74 and 76, these members being secured at the bottoms thereof on a pair of conical supports 75 and 77 which stand respectively on bed plates 78 and 80. A pair of braces 82 and 84 which are secured as by welding between the tracks 70 and 72 and the support structure of the conveyor mechanism provide additional structural support for the tracks 70 and 72. Also, in furtherence of the utilization of the hopper 24 for baseboards of different widths, the support base plate 78 is adjustably secured in a lateral direction relative to the longitudinal axis of the conveyor supporting member 86 by means of a plurality of headed bolts 88 which are secured to the plate 86 and extend upwardly through the elongated slots 89 which are provided in the plate 78.

As previously indicated, the lower ends of the guide tracks 44 and 46 are tapered outwardly terminating in a portion which mates with the upper end of the vertical guide tracks 70 and 72. In order to further insure that the baseboards 10 are accurately positioned on the transfer mechanism, a V-shaped vertical guide track 90 is disposed adjacent to the vertical guide track 72 at a distance equal to that between the guide notch 12 and the notch 14 in the baseboards 10. To permit the baseboards 10 to ride out of the chute 30 and onto the vertical guide tracks 70, 72 and 90, the guide rails 50 and 52 are terminated at a distance above the conveyor slightly above the point at which the guide tracks 44 and 46 terminate. Furthermore, the upper surface of the lower ends of the guide rails 50 and 52 are conformably curved to the downturned surface of the guide tracks 44 and 46 so that the baseboards 10 remain in a substantially horizontal position from the time they are first placed in the hopper 24 until they are transferred to the upright guide tracks 70, 72 and 90 and finally fed to the transfer mechanism 16 by the finger 106a.

The upright conical supports 75 and 77 which serve to support the hopper mechanism also support the portion of the transfer mechanism 16 which includes the rod 22 and the finger 106a and associated parts. Specifically, the support 77 carries at its upper end a bearing block (not shown) through which extends the bar 22, the rear end of which is suitably connected to the piston of the air motor 20 and is provided with a rectangular groove (not shown) for slidably receiving the transfer bar section 22. Suitable means such as retainer plates are secured to the inner face of the bearing block of the support 77 and serve to maintain the transfer bar 22 within the groove therein.

In order to prevent the finger 106a from forcing the lowermost board rearwardly as the transfer rod 22 is retracted, and adjustable stop member 120 is mounted on the conical support 77 behind the vertical stack of baseboards 10, thereby to hold the bottom board in place causing the finger 106a to pass thereunder until it snaps up into the notch 12. The stop 120 suitably consists of an upright portion 120a which is secured near the lower end theerof to a rod 120b which is slidably secured in a recess 121 in the support 77, thereby to enable adjustment of the position of the stop 120 to accommodate different lengths of baseboards 10. The upright 120a extends upwardly directly beneath the guide rails 52 and is tapered at the upper end thereof, as shown.

In order to insure that the baseboards 10 are properly inserted into the guides 27 and 29 for feeding onto the track 19, a pair of auxiliary guide members 123 are provided just forward of and in line with the guides 29 with the respective grooves 124 therein arranged opposite the forward end of the lowermost board in the hopper 24. Therefore, as the transfer rod 22 is extended upon energization of the air motor 20 so as to move the tip 114a of the finger 106a forwardly, the bottom board 10 is moved into the grooves 124 and runs through the guide member 123 onto the track 19 and to the first assembly station. To accurately locate the forward edge of the lowermost board in the hopper 24 with the grooves 124 and to insure that only the bottom board will be moved out of the hopper by operation of the finger 106a, a plurality of support rollers 116 are disposed with the upper surfaces thereof tangential to the horizontal plane which includes the bottom wall of the groove 124, this plane being located below the bottom end of the guide track 70 and 72 and separated therefrom by a distance slightly greater than the thickness of the baseboards 10. Therefore, upon actuation of the transfer rod 22, the tip 114a of the finger 106a is slidably moved towards the track 19 and engages only the lowermost board 10, the remaining boards being held in place by the guide tracks 70 and 72 which extend within the notches 12 and 13. Because of the large downward force exerted on the rollers 116 by the baseboards 10 located in the hopper 24, it is necessary that these rollers be journaled in suitable bearings so that an excessive force need not be exerted upon the transfer rod 22 to slide the lowermost board 10 out of the hopper 24 and onto the guide track 19.

Since the tip 114a of the finger 106a cannot extend upwardly beyond the lowermost board and since it is not uncommon for the baseboards 10 to be warped, the rollers 116 are journaled in the upper portions of the supports 75 and 77 in close proximity to and on opposite sides of the line connecting the lower ends of the vertical guide tracks 70 and 72. Since, therefore, the baseboards 10 are supported from locations near the longitudinal median thereof along which the notches 12 and 13 and the tip 114a of finger 106a are arranged, irrespective of whether or not the boards 10 are warped, the bottom board and only the bottom board will always be transferred from the hopper 24 to the track 19 when the air motor 20 is actuated to extend the transfer rod 22 in a forward direction.

Although four rollers 116 arranged in two pairs have been shown, a greater or fewer number may be used as long as they are arranged in close proximity with the longitudinal median of the bottom board in the hopper 24 and also near the finger 106a. For example, three rollers arranged with one roller centrally located forward of the longitudinal median and with the remaining two rollers near the edges of the lowermost board 10 rearward of the longitudinal median may be employed.

While there has been described what is considered to be the preferred embodiment of the invention, it will be understood that various modifications may be made therein which are within the true spirit and scope of the invention as defined in the appended claims.

What is claimed as new and desired to be secured by Letters Patent of the United States is:

1. A hopper for feeding baseboards having centrally located notches in the opposite edges thereof to a step-by-step transfer mechanism having at least one finger member which is adapted to be inserted within one of said notches for slidably moving the engaged baseboard from one station to another, comprising, first and second guide tracks one parallel to the other, said tracks being inclined to the horizontal and adapted to be received in said notches, means adapted to slidably engage said boards to maintain them in a horizontal position when they are located in said hopper, support means, said tracks being downturned at the lower ends thereof above said support means and said finger member, thereby to accurately position the boards on said support means with one of said notches opposite said finger member.

2. A hopper for feeding baseboards having centrally located notches in the opposite edges thereof to a step-by-step transfer mechanism having at least one finger member which is adapted to be inserted within one of said notches for slidably moving the engaged baseboard from one station to another, comprising, first and second guide tracks one parallel to the other, said tracks being inclined to the horizontal and adapted to be received in said notches, means adapted to slidably engage said boards to maintain them in a horizontal position when they are located in said hopper, support means, said tracks having a bottom upright portion terminating above said support means, in alignment with said finger member, thereby to accurately position the boards on said support means with one of said notches opposite said finger member.

3. A mechanism for supplying base boards to a conveyor, said base boards having considerable longitudinal length, said mechanism comprising a support member, a chute disposed above the support member and adapted to maintain a plurality of said base boards in a stack on said support member, said support member having a plurality of portions upon which the lowermost board in said stack rests, said portions being very short with respect to said length of the boards and adapted to engage said lowermost board at locations longitudinally spaced a relatively small distance apart along the said length, and transfer means for moving said lowermost board out of said stack and onto said conveyor, the spacing of the supports being in the direction of transfer movement, said transfer means being adapted to engage said lowermost board in said longitudinal space for removal of the board from said stack, whereby boards somewhat misshapen will be fed as well as planar boards.

References Cited in the file of this patent

UNITED STATES PATENTS

| | | |
|---|---|---|
| 1,048,660 | Clawson | Dec. 31, 1912 |
| 1,688,369 | Willard | Oct. 23, 1928 |
| 2,176,384 | Varney | Oct. 17, 1939 |
| 2,648,445 | Roessl et al. | Aug. 11, 1953 |
| 2,693,898 | Epperson | Nov. 9, 1954 |
| 2,704,618 | Skowron | Mar. 22, 1955 |

FOREIGN PATENTS

| | | |
|---|---|---|
| 538,609 | Germany | Nov. 16, 1931 |